June 18, 1957 T. DANNEVIG ET AL 2,796,081
VALVE ASSEMBLIES AND METHODS OF MAKING THE SAME
Filed Nov. 20, 1953 2 Sheets-Sheet 1
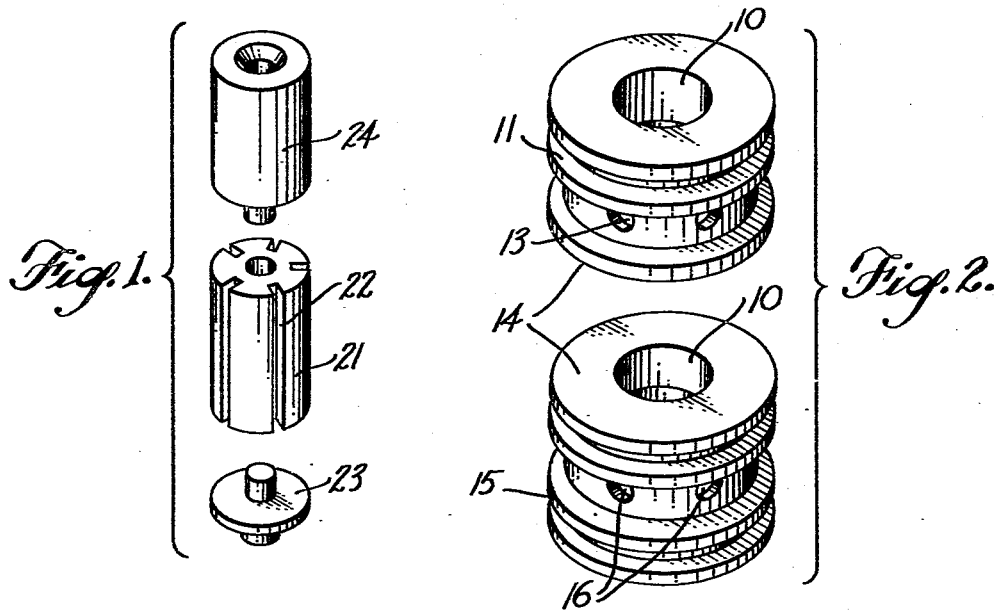
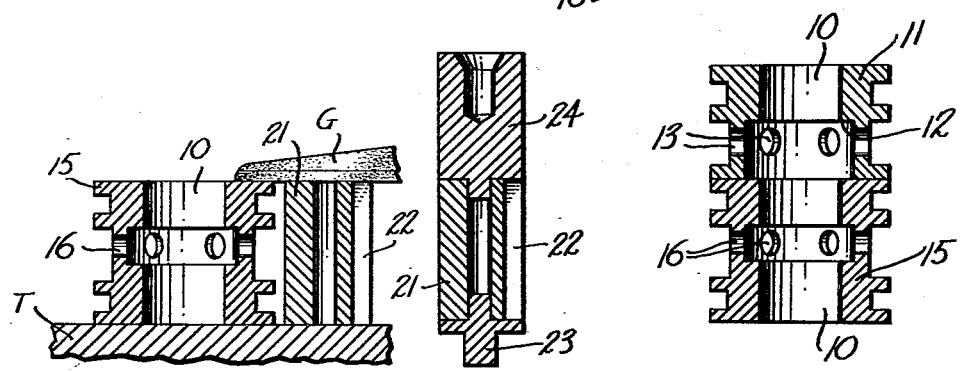
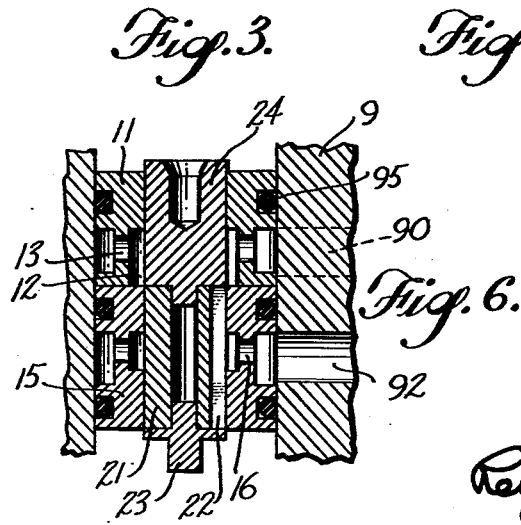
INVENTORS.
TORD DANNEVIG
GLEN D. CULLOR
BY
Reynolds, Beach & Christensen
ATTORNEYS June 18, 1957  T. DANNEVIG ET AL  2,796,081
VALVE ASSEMBLIES AND METHODS OF MAKING THE SAME
Filed Nov. 20, 1953  2 Sheets-Sheet 2

INVENTORS.
TORD DANNEVIG
GLEN D. CULLOR
BY
Reynolds, Beach & Christensen
ATTORNEYS United States Patent Office 2,796,081
Patented June 18, 1957

2,796,081

VALVE ASSEMBLIES AND METHODS OF MAKING THE SAME

Tord Dannevig and Glen D. Cullor, Seattle, Wash., assignors to Boeing Airplane Company, Seattle, Wash., a corporation of Delaware Application November 20, 1953, Serial No. 393,316

8 Claims. (Cl. 137—622)

This invention relates to a spool valve, particularly one which is required to shift from a closed to an open position or vice versa with minimum, even zero, lag, and which must in consequence have precisely predetermined overlap, approaching or equalling zero. Such valves are used in modern hydraulic servo systems, particularly upon aircraft, and must have precise sharp action, with virtually no dead spots between flow reversals within, say, a four-way valve, or if any, then a controlled amount, of lost motion.

Such valves, requiring manufacture to the very high standard indicated, have heretofore been extremely expensive, for they have required very precise machining in all dimensions. Accordingly, it is a primary object of the present invention to provide a valve structure and a method of making the same whereby equal precision may be achieved in the valve structure, yet at a much lower cost.

It is believed the invention will be best understood from a detailed description of the valve structure and of the process by which it is made, as set forth hereinafter.

In the drawings the valve structure is shown incorporated in a typical design and assembled in a normal relationship, it being understood that the details of the design and of the individual assemblies and of the assembly as a whole, may be varied to suit varying conditions.

Figure 1 is an exploded isometric view of the individual parts which constitute the composite spool of the valve assembly, and Figure 2 is a similar view of the parts which constitute the composite sleeve of the valve assembly.

Figure 3 is a sectional view of a conjoint finishing step in the method, which step is one of the salient factors in accomplishing the desired results.

Figure 4 is an axial sectional view of the assembled composite spool, this assembly being a method step following the step illustrated in Figure 3, and Figure 5 is a similar view of the composite sleeve assembly, this assembly being a step which parallels the step illustrated in Figure 4.

Figure 6 is an axial sectional view of an individual valve assembly complete, and with parts in operative (closed) relationship, the design being one in which the predetermined overlap is zero.

Figure 7:
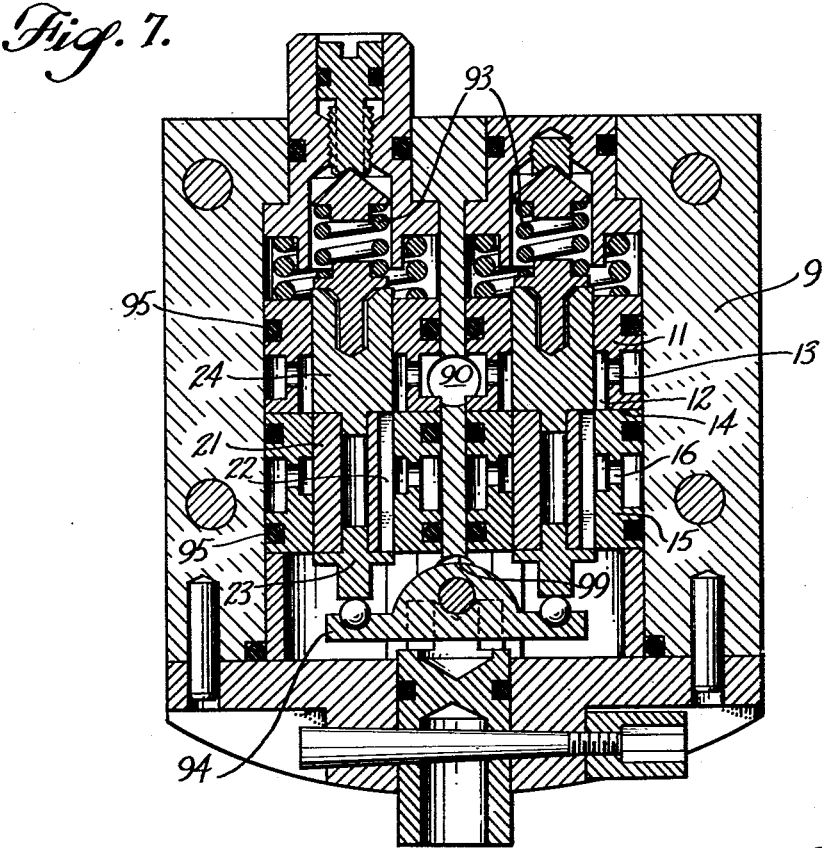
Figure 7 is an axial sectional view of a simple but representative valve assembly as a whole, in a typical arrangement, such as would incorporate dual individual valve assemblies of the type shown in Figure 6. The viewpoint in Figure 7 is at 90° to the viewpoint in Figure 6.

Referring first to the assembly as a whole as shown in Figure 7, a casing 9 is provided with two fluid passages or ports 90 and 99, the first of which may be an inlet port and the second of which may be an outlet port, and communication between alternate ends of a double-acting servo jack (not shown), for example, may be established with these respective fluid passages 90 and 99, and through branch passages 92, for example, through the medium of a pair of alternately shiftable spool valve assemblies housed within the casing 9. In general each spool valve assembly includes a sleeve ported for communication with one of the ports as 90, and with one of the branch passages, as 92, and by way of its end with the second port 99. A spool is slidably fitted within each such sleeve, the spools in Figure 7 being balanced in closed position by springs 93 and by a common balance arm 94. Such an arrangement is not of itself claimed as a part of this present invention.

The present invention resides rather in the composite sleeve assembly and the composite spool assembly of each individual valve, which we are about to describe, and in their relationship, and in the method whereby they are manufactured.

The sleeve assembly, shown in Figure 2, is formed of two separate parts divided transversely of the axis, and when assembled abutting along a common mating plane. One such part, designated by the numeral 11, is interiorly recessed inwardly from that end which lies in the mating plane, as is indicated at 12, and is ported at 13 transversely to its axis for communication between that recess and the fluid passage 90. The second sleeve part 15 is ported at 16 for communication between its bore 10 and a fluid passage such as 92. The port 16 is located between the ends of this second sleeve part 15. When assembled, these two parts 11 and 15 meet along the common mating face indicated at 14, this mating face being ordinarily ground or otherwise finished to a tight fit prior to their assembly, as will appear later. The diameter of the bore 10 of the two sleeve parts 11 and 15 is finished after they are assembled, hence is of uniform diameter throughout, so that when they are assembled this constitutes in effect one single bore.

The corresponding spool assembly is shown in Figure 1 and is formed in three separate parts, of which the central part 21 (which may be termed the second spool part, since it is paired with the second sleeve part) is formed with external longitudinally directed fluid passages such as the grooves 22, extending from its one end to its opposite end. The ends of these fluid passages are closed at one end by the first spool part 23, paired with the first sleeve part, and at the other end by the end cap 24. These three components 21, 23 and 24 of the spool assembly are finished after assembly to identical external diameters which correspond very precisely to the bore diameter 10 of the spool assembly, in such manner that when the assembled spool is fitted within the bore of the assembled sleeve, the spool assembly will slide within the sleeve assembly but the passages 22 will be fluid-tight therein so long as the part 21 does not extend axially beyond the part 15.

The purpose of forming the sleeve assembly and the spool assembly, respectively, in separate parts is primarily to enable the second sleeve part 15 and the paired second spool part 21 to be finished together to corresponding lengths. This may mean that their lengths are identical, in a valve having zero overlap, or it may mean that their lengths differ by some precise amount; for example the spool part 21 may be shorter than the sleeve part 15 by anywhere from .0002" to .001", that is to say, by whatever may be the desired finite overlap.

If zero overlap is desired, the previously finished ends of a spool part 21 and of a sleeve part 15 which is to be paired therewith are rested side by side upon a grinding table T (Figure 3), are suitably held there, and the opposite ends are conjointly finished, as by a grinding wheel G. This need not be done to any meticulously precise dimension, since any departure from precision in the one part is matched by like departure in the paired part. When finished, the two parts (or all parts in a batch ground simultaneously) are of the same length. If a finite overlap is desired, the simultaneous grinding step of Figure 3 is followed by removal of the sleeve part 15 from the grinding table, and, with backlash already taken up in the grinder feed mechanism and an absolute base reference established by the preceding operation, the required overlap can be taken off the spool part 21, as in Figure 8, very accurately by feeding this dimension in by means of the dial vernier on the grinder feed adjustment. The lack of need for precision in original length eliminates one close tolerance dimension, simplifies the operation, and reduces its cost.

Figure 8:
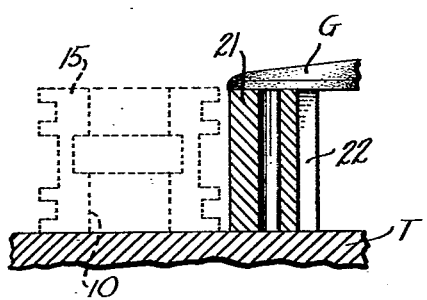
Figure 8 is a view similar to Figure 3, illustrating a modification of the grinding step when it is desired that the predetermined overlap be something greater than zero.
Figure 9:
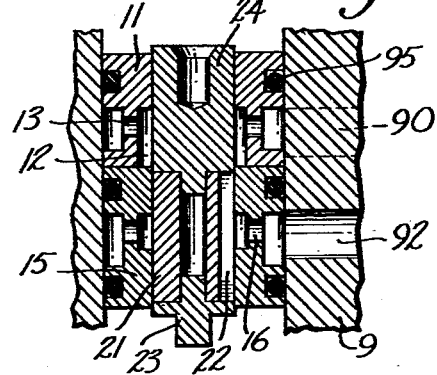
Figure 9 is a view similar to Figure 6 showing a valve assembly with a finite overlap, greatly exaggerated.

Having thus finished the central spool part 21 and the second sleeve part 15 to the precisely predetermined overlap, whether zero or substantially so, even though somewhat more than zero, the spool assembly is completed by abutting its several parts 23, 21 and 24 in axial alignment and securing them together, as by brazing, and in similar fashion the sleeve assembly is completed by end-abutting its parts 11 and 15 in axial alignment, and by securing them together in a similar manner. The external diameter of the assembled spool, and the bore diameter of the sleeve assembly are then finished with only the desired clearance, say, .0001, and the matched assemblies are fitted together. The completed assembly of the spool is shown in Figure 4 and of the sleeve in Figure 5. As shown in Figure 6, by reason of the conjoint finishing to length of the second spool part 21 and of the second sleeve part 15, the complete spool and sleeve assemblies, respectively, when assembled together will have precisely zero overlap. If the spool assembly is slid upwardly as viewed in Figure 6, the port 16 will be placed in communication with the passage 90, and if the assembly as a whole is a dual assembly as in Figure 7, the opposite valve will be displaced oppositely and its port 16 will be placed in communication with the passage 99. The transition from closed position to an open position is accomplished without any lag or overlap. Of course if overlap is desired, then by the method already described and by the assembly exaggeratedly shown in Figure 9 a predetermined overlap, divided as may be preferred between two ports 90 and 99, is accomplished by such a modification of the method as is illustrated in Figure 8.

The individual assemblies are mounted within the casing 9 in such manner that they are properly sealed, as indicated at 95, with relation to the walls of the bore of the casing 9 within which the valve assemblies are seated. These rubber seals, however, have no part in the seating of the valve itself, and so there is no reliance on rubber or its compressibility for effecting a tight seal and for achieving the desired amount of overlap.

The valve illustrated is a simple type, but the method and arrangement described are equally applicable to multiple valves. If, say, a valve is to control several ports instead of one, then the number of spool parts and paired sleeve parts required would be employed, and the separation between the several parts would be at the several mating planes, instead of the single mating plane required by the simple valve chosen to illustrate the principles of this invention.

We claim as our invention:

1. A valve assembly comprising a composite sleeve formed in a set of separate sleeve parts which are assembled in pairs and all in axial alignment, all being of identical bore diameter, each pair of adjoining parts abutting, when assembled, at a transverse mating plane, a first part of each pair having its bore annularly recessed for a distance inwardly from the mating plane, and ported for communication with a first fluid passage, the second part of each pair being ported intermediate its ends for communication with a second fluid passage, and arranged for communication by way of its bore with a third fluid passage, a composite spool comprising, for each pair of sleeve parts, a corresponding pair of spool parts, namely a first part complemental to and of an axial length at least equal to the length of the first sleeve part, to block off the latter's port, and a second part complemental to and of an axial length such relative to the length of the second sleeve part as to define an overlap chosen between a finite value and zero, and having fluid-directing passages extending longitudinally from its one end to its other end, and the first spool part being axially aligned with and abutting, when assembled, one end of the second spool part to close the latter's passages at this end to the annular recess of the first spool part, and the composite spool including also a similarly axially aligned end cap which when assembled abuts the opposite end of the terminal second spool part of the set, and similarly closes that end of such second spool part's passages to the third fluid passage, the complemental spool and sleeve parts being of interfitting external and bore diameters, respectively, said sleeve parts being secured together in the specified assembled relationship, and the spool parts being also secured together in the specified assembled relationship, and being received within the composite sleeve's bore with the corresponding ends of the second spool and sleeve parts of each pair registering within the chosen overlap, and for axial sliding of the spool relative to the sleeve, for placing the port of the second sleeve part in communication, by way of the central spool part's longitudinal passages, with the first sleeve part's recess or with the third fluid passage beyond the opposite end of the second sleeve part, depending upon the sense of the spool's axial movement.

2. A valve assembly comprising a composite sleeve formed in two separate sleeve parts which are axially aligned, when assembled, of identical bore diameter, and abutting at a transverse mating plane, a first part having its bore annularly recessed for a distance inwardly from the mating plane, and ported for communication with a first fluid passage, the second part being ported intermediate its ends for communication with a second fluid passage, and arranged for communication by way of its bore with a third fluid passage, a composite spool comprising three separate spool parts, namely, a central part of a length at least equal to the length of the second sleeve part, a first part of a length at least equal to the length of the first sleeve part, and an end cap, all abutting, when assembled, at transverse mating planes, in axial alignment, and all of an external diameter to fit closely the spool's bore diameter, said central spool part having fluid-directing passages extending longitudinally from one mating plane to the other and which, when the spool is assembled, are closed by the first spool part and by the end cap, respectively, and being itself received within the bore of and being of a length having an overlap with respect to the length of the second sleeve part chosen between zero and a finite value, said sleeve parts being secured together in the specified assembled relationship, and the spool parts being also secured together in the specified assembled relationship, and being received within the composite sleeve's bore with the corresponding ends of the central spool part and the second sleeve part registering within the chosen overlap, and for axial sliding of the spool relative to the sleeve, for placing the port of the second sleeve part in communication, by way of the central spool part's longitudinal passages, with the first sleeve part's recess or with the third fluid passage beyond the opposite end of the second sleeve part, depending upon the sense of the spool's axial movement.

3. A valve assembly as in claim 1, characterized in that the second spool part and the complemental second sleeve part in a pair are of exactly the same length, whereby the predetermined overlap is zero.

4. A valve assembly as in claim 1, characterized in that the second spool part is of a length slightly less than the length of the complemental second sleeve part of the pair, whereby the chosen overlap is represented by this difference.

5. A valve assembly comprising a generally cylindrical first sleeve part axially recessed inwardly from one end face and transversely ported for communication between said recess and a first fluid passage, a separate second generally cylindrical sleeve part transversely ported intermediate its ends for communication between its bore and a second fluid passage, said second sleeve part being of predetermined length, and said sleeve parts being of identical bore diameter, axially aligned, abutting at the recessed end face of the first part, and secured permanently together to constitute a composite sleeve, a second spool part of a length identical with the length of the second sleeve part, and having an external fluid passage extending from its one end to its other end, a separate first spool part and an end cap at the respectively opposite ends of said central spool part, in position to close the latter's fluid passage, said end cap and said two spool parts being permanently secured together to form a composite spool, being all of like external diameter, such as will fit fluid-tightly but slidably within the bore of the composite sleeve, the second spool part being located with its ends in registry with the corresponding ends of the second sleeve part when the valve assembly is closed, but being slidable from such registry to one or the other side of such closed position for communication with the recess of the first sleeve part, or alternately with the space beyond the opposite end of the second sleeve part.

6. A method of manufacturing a spool valve which comprises forming the sleeve of two separate parts, of which a first part is recessed inwardly from one end face and ported, and a second part is ported intermediate its ends; forming the spool of three separate parts, one of which constitutes a second spool part and is formed externally with a fluid passage extending from its one end to the other, and the other two of which constitute respectively a first spool part complemental to the first sleeve part and an end cap, which when applied to the opposite ends of the central part close the ends of the latter's fluid passage; finishing the second spool part and the second sleeve part conjointly at at least one end face to a common plane, while their opposite end faces are held in a predetermined planar relationship; securing both sleeve parts thereafter in abutted, coaxial relationship, and similarly securing together all three spool parts; finishing the external spool diameter and the sleeve's bore to a close sliding fit; inserting the composite spool within the composite sleeve with the end faces of the second spool part in predetermined overlap relationship to the abutted end faces of the two sleeve parts, for axial shifting of the composite spool in one sense or another from such closed position.

7. A method as in claim 6, wherein preliminarily to the conjoint finishing of the one end face of the second sleeve part and of the second spool part their opposite end faces are supported in exact coplanar disposition, and are so held during such conjoint finishing of the other end face.

8. A method as in claim 6, wherein subsequently to the conjoint finishing of the one end face of the second sleeve part and of the second spool part an end face of the second spool part is refinished to reduce said second spool part to a length less than that of the complemental second sleeve part.

References Cited in the file of this patent

UNITED STATES PATENTS

| | | |
|---|---|---|
| 650,540 | Bromley | May 29, 1900 |
| 2,158,737 | Wunsch | May 16, 1939 |
| 2,200,830 | Beharrell | May 14, 1940 |
| 2,600,702 | Stephens | June 17, 1952 |
| 2,624,540 | Johnson | Jan. 6, 1953 |
| 2,630,135 | Johnson | Mar. 3, 1953 |
| 2,645,450 | Chessman | July 14, 1953 |
| 2,645,451 | Gladden | July 14, 1953 |

FOREIGN PATENTS

| | | |
|---|---|---|
| 687,382 | Great Britain | Feb. 11, 1953 |